United States Patent [19]

Kawasaki et al.

[11] 4,246,578

[45] Jan. 20, 1981

[54] PATTERN GENERATION DISPLAY SYSTEM

[75] Inventors: Itaru Kawasaki, Minou; Goro Hamano, Osaka, both of Japan

[73] Assignee: Matsushita Electric Industrial Co., Ltd., Osaka, Japan

[21] Appl. No.: 10,988

[22] Filed: Feb. 8, 1979

[30] Foreign Application Priority Data

Feb. 8, 1978 [JP] Japan ................................ 53-13734

Jun. 26, 1978 [JP] Japan ................................ 53-77647

[51] Int. Cl.[3] ............................................. G06F 3/153

[52] U.S. Cl. ................................... 340/750; 340/724; 340/799

[58] Field of Search ........................ 340/724, 748, 750

[56] References Cited

U.S. PATENT DOCUMENTS 3,729,714 4/1973 Heard ............................ 340/748 X

*Primary Examiner*—David L. Trafton

*Attorney, Agent, or Firm*—Wenderoth, Lind & Ponack

[57] ABSTRACT

A pattern generation display system has a pattern code processing means, a refresh memory, a pattern generator and a pattern data processor. A pattern position on the raster scan display is defined by a base position datum and a displacement datum. The pattern code processor can calculate both of the position data as the address data for an effective operation. The refresh memory stores the code of a pattern and the displacement datum thereof at the address corresponding to the base position datum thereof. The pattern data processor completes the display of the pattern at the position deviated from the base position by the displacement datum. Such a system can easily shift the pattern generated by the pattern generator on the display screen by a small pitch. Therefore, it is easy to adjust the position of characters corresponding to the character or sentence features.

6 Claims, 19 Drawing Figures

| INPUT DATA | | | | | | | | OUTPUT DATA | | | | |
|---|---|---|---|---|---|---|---|---|---|---|---|---|
| RA3 | RA2 | RA1 | RA0 | ΔY3 | ΔY2 | ΔY1 | ΔY0 | BORROW | ΔY3 | ΔY2 | ΔY1 | ΔY0 |
| 0 | 0 | 0 | 0 | 0 | 0 | 1 | 1 | 1 | 1 | 1 | 0 | 1 |
| 0 | 0 | 0 | 1 | 0 | 0 | 1 | 1 | 1 | 1 | 1 | 1 | 0 |
| 0 | 0 | 1 | 0 | 0 | 0 | 1 | 1 | 1 | 1 | 1 | 1 | 1 |
| 0 | 0 | 1 | 1 | 0 | 0 | 1 | 1 | 0 | 0 | 0 | 0 | 0 |
| 0 | 1 | 0 | 0 | 0 | 0 | 1 | 1 | 0 | 0 | 0 | 0 | 1 |
| 0 | 1 | 0 | 1 | 0 | 0 | 1 | 1 | 0 | 0 | 0 | 1 | 0 |
| 0 | 1 | 1 | 0 | 0 | 0 | 1 | 1 | 0 | 0 | 0 | 1 | 1 |
| 0 | 1 | 1 | 1 | 0 | 0 | 1 | 1 | 0 | 0 | 1 | 0 | 0 |
| 1 | 0 | 0 | 0 | 0 | 0 | 1 | 1 | 0 | 0 | 1 | 0 | 1 |
| 1 | 0 | 0 | 1 | 0 | 0 | 1 | 1 | 0 | 0 | 1 | 1 | 0 |
| 1 | 0 | 1 | 0 | 0 | 0 | 1 | 1 | 0 | 0 | 1 | 1 | 1 |
| 1 | 0 | 1 | 1 | 0 | 0 | 1 | 1 | 0 | 1 | 0 | 0 | 0 |
| 1 | 1 | 0 | 0 | 0 | 0 | 1 | 1 | 0 | 1 | 0 | 0 | 1 |
| 1 | 1 | 0 | 1 | 0 | 0 | 1 | 1 | 0 | 1 | 0 | 1 | 0 |
| 1 | 1 | 1 | 0 | 0 | 0 | 1 | 1 | 0 | 1 | 0 | 1 | 1 |
| 1 | 1 | 1 | 1 | 0 | 0 | 1 | 1 | 0 | 1 | 0 | 0 | 0 |

PATTERN GENERATION DISPLAY SYSTEM

This invention relates to a pattern generation display system and particularly to such a system for controlling the position of the pattern by shifting it a small pitch on a screen such as a cathode ray tube (CRT).

A number of techniques are known for generating patterns stored in a memory by read-out timing of the raster sweeps so the patterns can be displayed on a screen such as a CRT screen. For example, U.S. Pat. No. 3,345,458 discloses such a conventional pattern generation display system. In it, a plurality of pattern data are digitally stored within a pattern generator and such digitally encoded patterns as ASKII codes are stored within a refresh memory. Each encoded pattern is placed at the address of the refresh memory corresponding to the display screen. The encoded pattern code is read out with a timing related to the raster sweep, and supplied to a pattern generator for generating pattern data in said pattern generator. Pattern data provide signals for modulating the density of the picture dots on the display screen.

A problem in this system is that since one pattern datum within a pattern generator is composed of a dot matrix having a fixed size, and these pattern data are transmitted to the display screen with a fixed timing, the patterns are compelled to be displayed on the display screen at a fixed pitch irrespective of pattern features. Such an arrangement often causes difficulty for users in recognizing and understanding the patterns displayed on the screen. When words are displayed on the screen, it is preferable for users to see such character arrangements on the screen with the distances between adjacent characters adjusted according to character features. To achieve such arrangement, a technique such an as used in a graphic display system is employed. The video memory in such a system contains one bit of digital storage for each picture dot on the screen. The dot pattern of the character is stored at the video memory address corresponding to the display position. Thus, the content of the video memory is in a one to one correspondence with the generated display for reading out the video memory in synchronization with a raster scan. In this case, the above-mentioned variable pitch can be achieved easily, because dot patterns can be loaded at any address of the video memory. However, the problems in prior art graphic display systems are that they are very costly, because a large scale video memory is necessary, and that a long processing time must be taken for each dot pattern data to be formed in the video memory, as compared with the first-mentioned conventional system wherein a pattern generator is used for generating pattern data by an encoded pattern signal from a refresh memory.

It is an object of this invention to provide a pattern generation display system having a pattern generator for optimizing the pattern pitch corresponding to pattern features and for moving or shifting a pattern by a small pitch.

This object is achieved according to this invention by providing a pattern generation display system for controlling the shifting of positions of patterns by a small pitch on a display screen, comprising: a pattern code processing means for producing a pattern code datum signal and a position datum signal composed of a base position address datum signal and a displacement datum signal corresponding to a pattern; a raster scan controller for generating base address data signals and raster address data signals; a refresh memory coupled to said pattern code processing means and said raster scan controller for storing pattern code data and displacement data at the base position address thereof by means of said pattern code datum signal, said base position address datum signal and said displacement datum signal which said pattern code processing means produces, and for generating pattern code data signals and displacement data signals by supplying base position address data signals thereto from said raster scan controller; a pattern generator coupled to said refresh memory and said raster scan controller for generating pattern data corresponding to said pattern code data from said refresh memory and said raster address data from said raster scan controller; and a pattern data signal processing means coupled to said pattern generator and said refresh memory for transmitting said pattern data from said pattern generator according to timings defined by said base position address data and said raster address data from said raster scan controller, and by said displacement data of from said refresh memory. Since pattern data are transmitted to a display from the pattern generator with a timing dependent on displacement data, pattern data can be displayed at a position shifted from the base position.

Other objects and features of this invention will become apparent from the following detailed description taken together with the accompanying drawings, in which.

Figure 3:
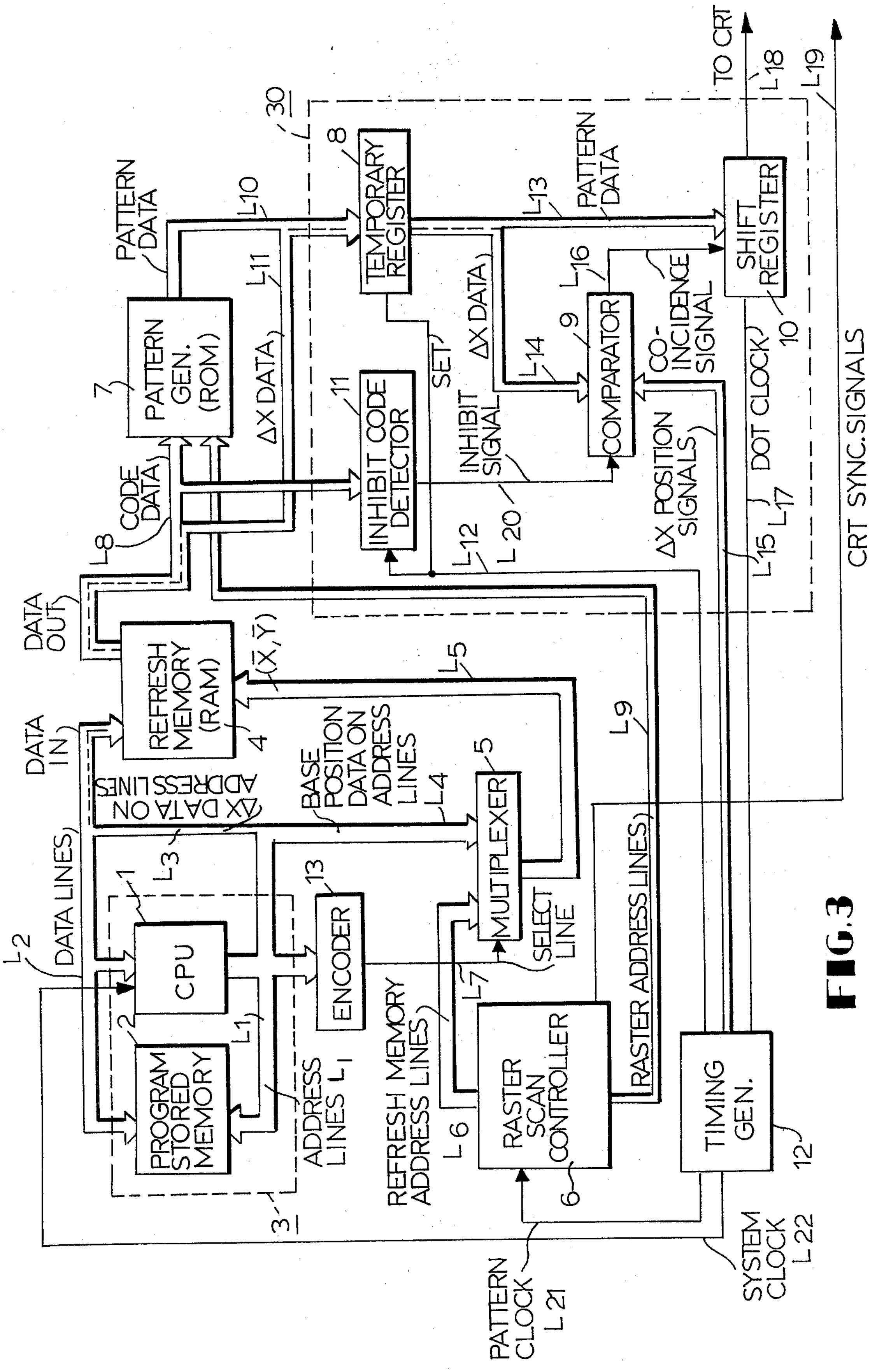
FIG. 3 is a block diagram illustrating a preferred embodiment of the invention.
Figure 5A:
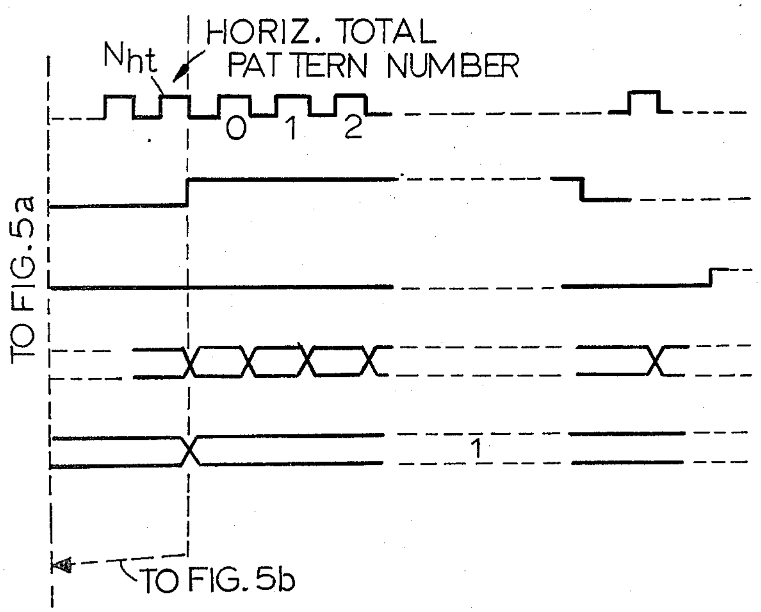
Figure 5B:
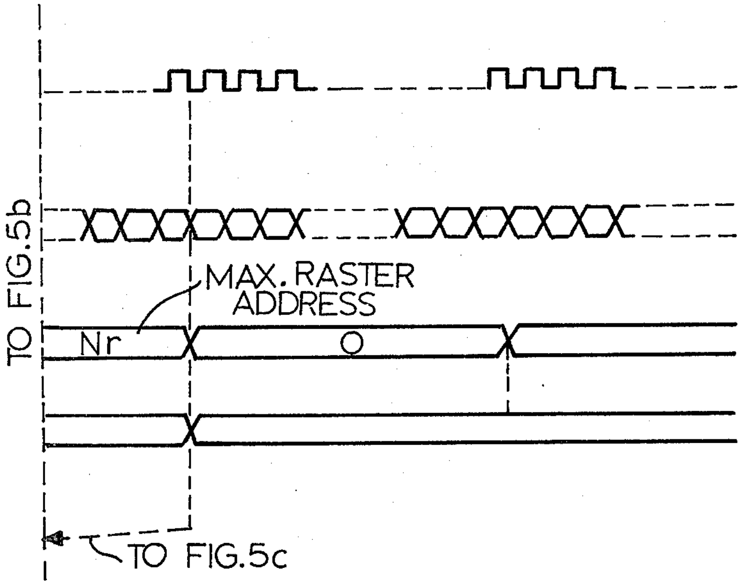
Figure 5C:
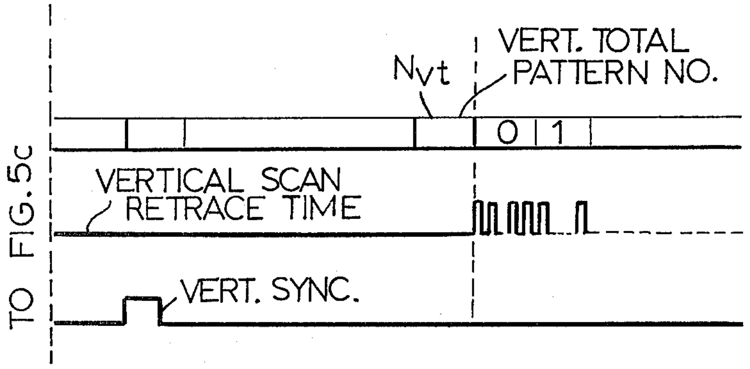
Figure 5A:
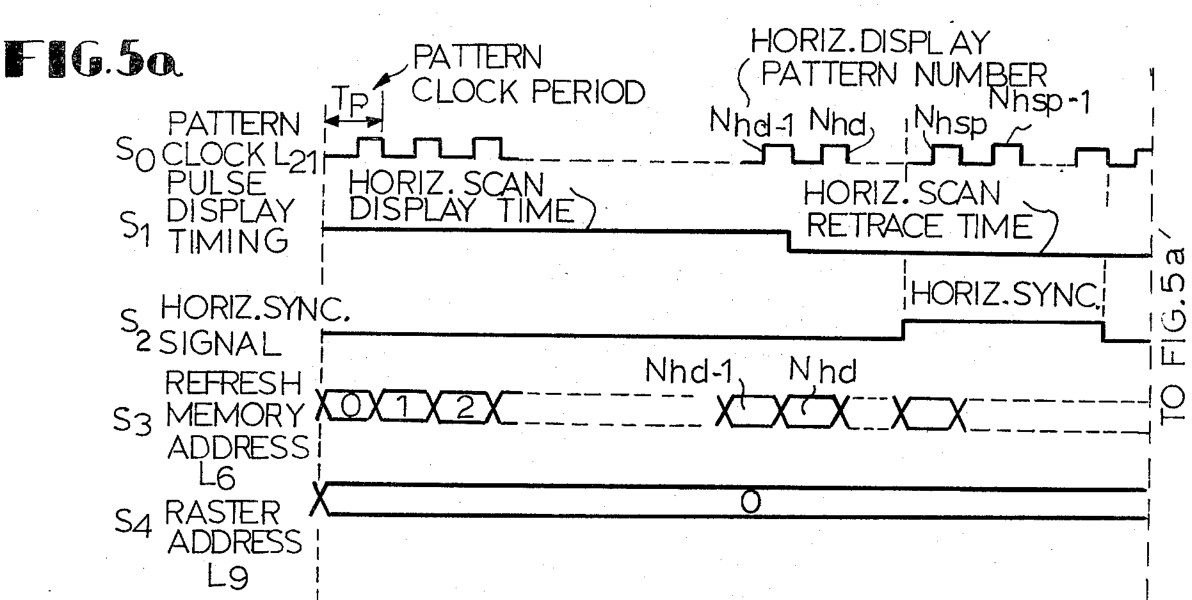
Figure 5B:
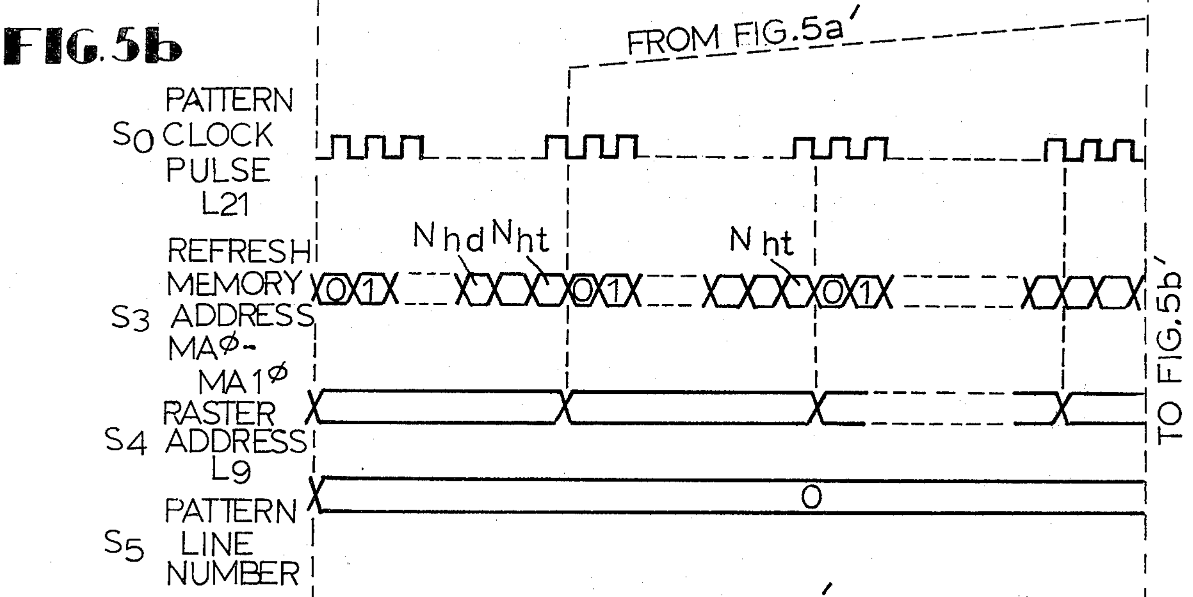
Figure 5C:
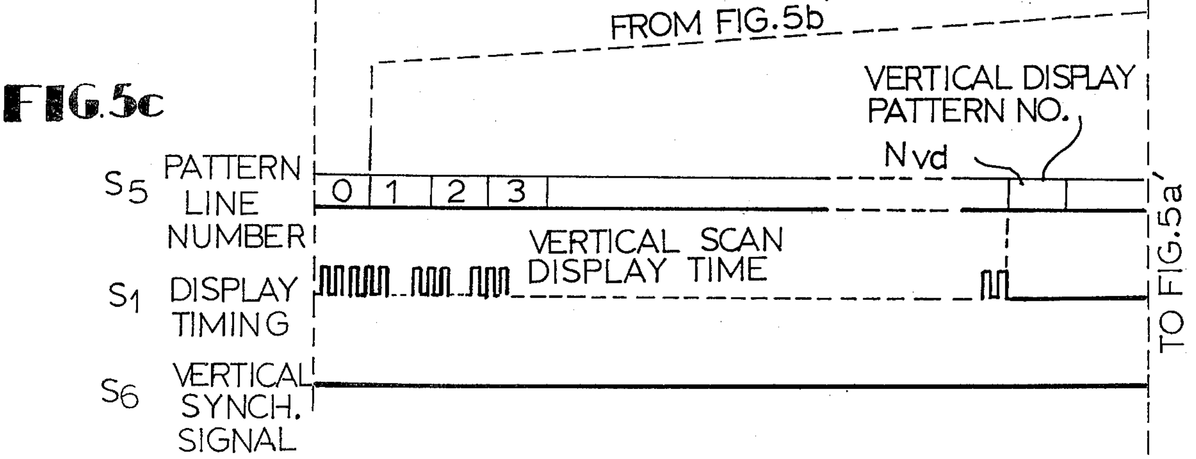
Figure 6:
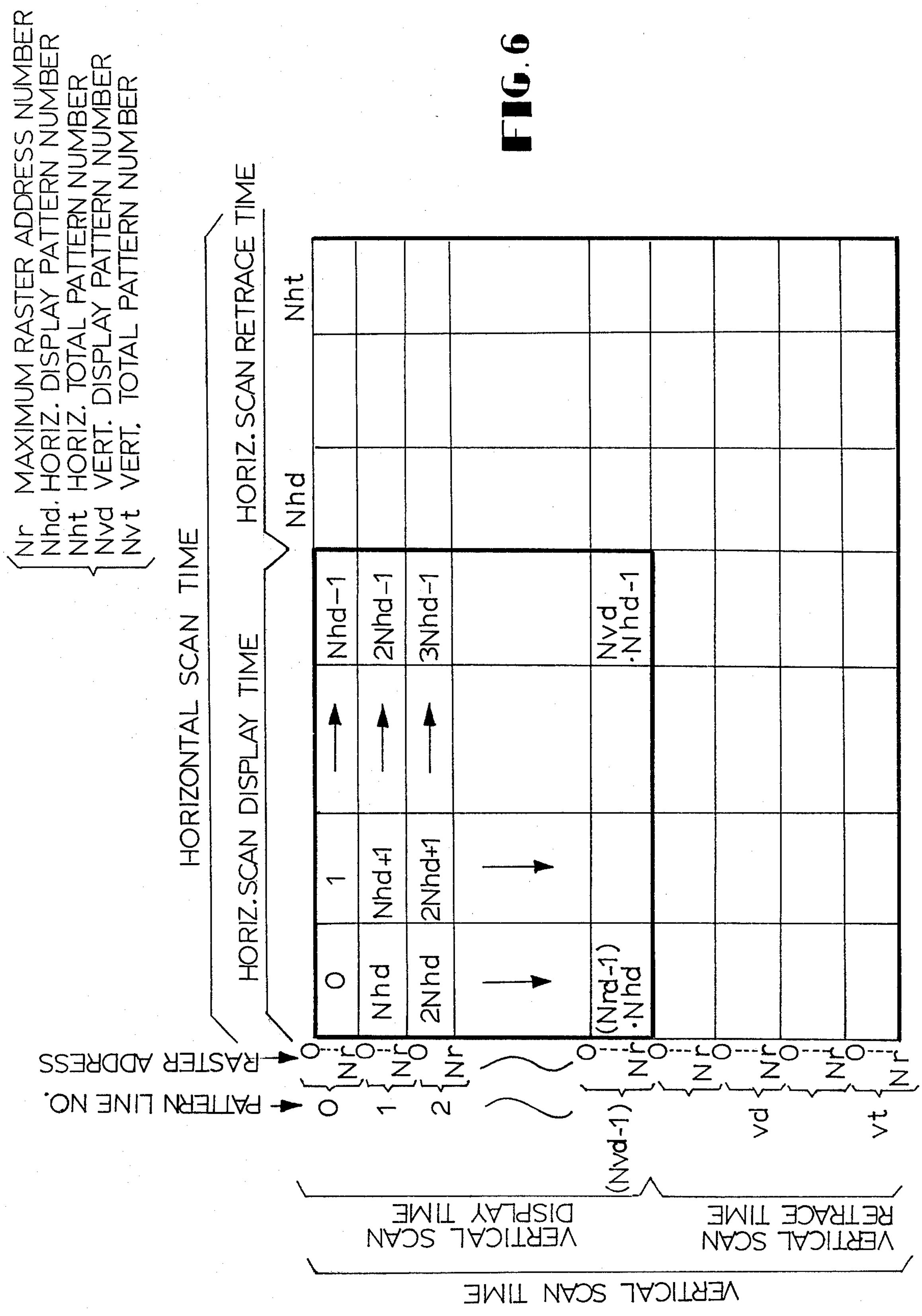
Figure 7A:
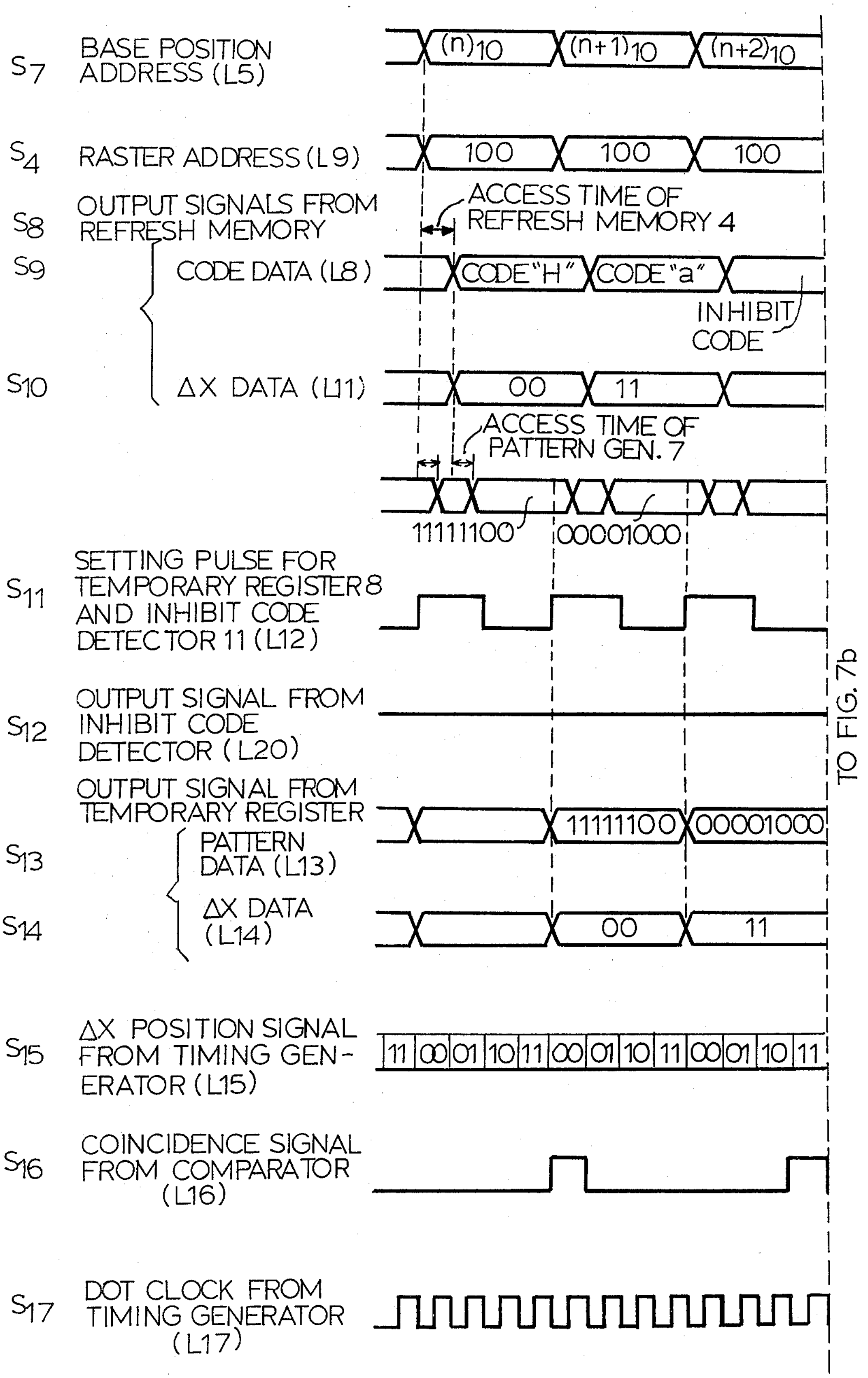
Figure 7B:
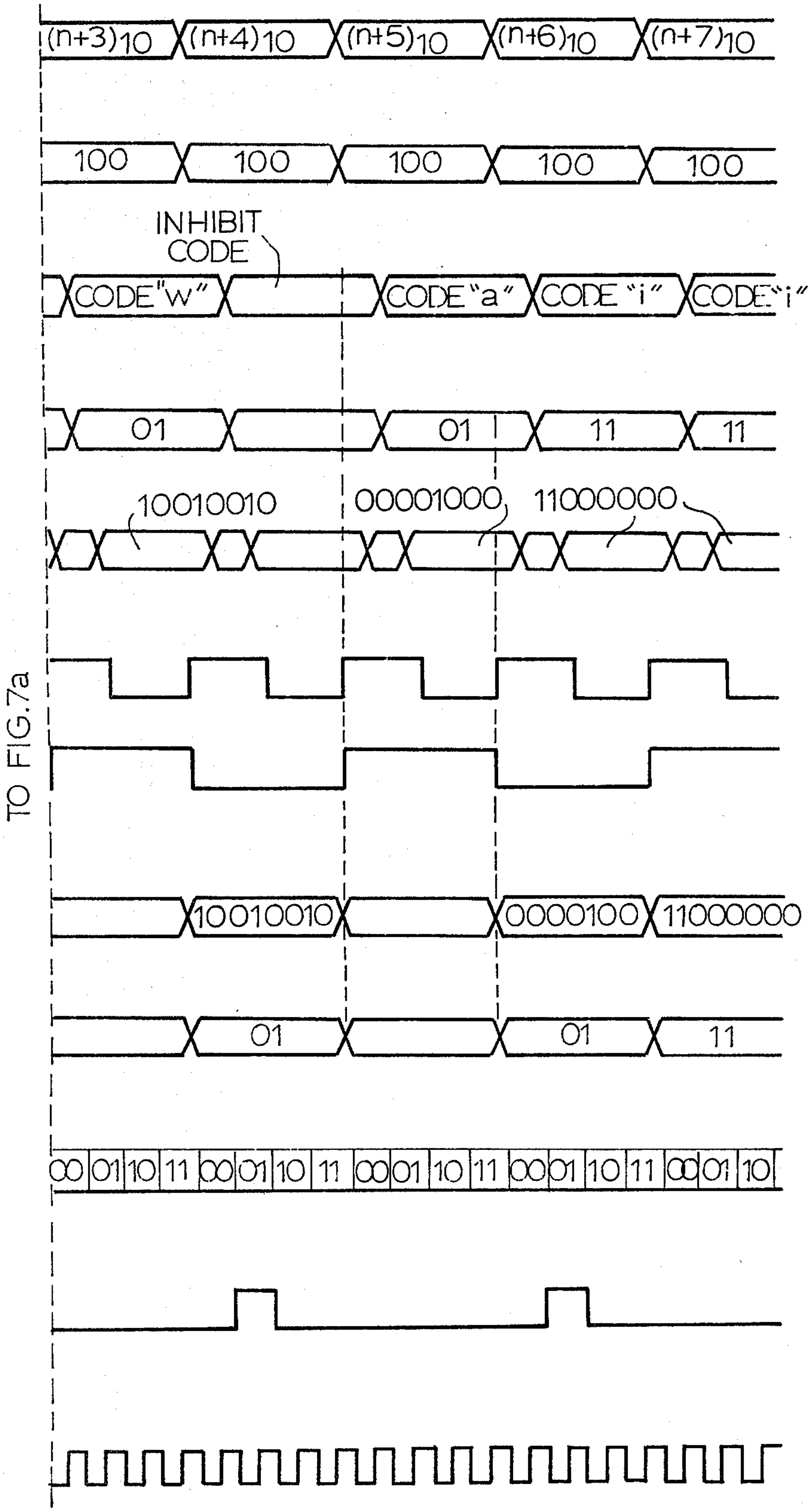
Figure 8:
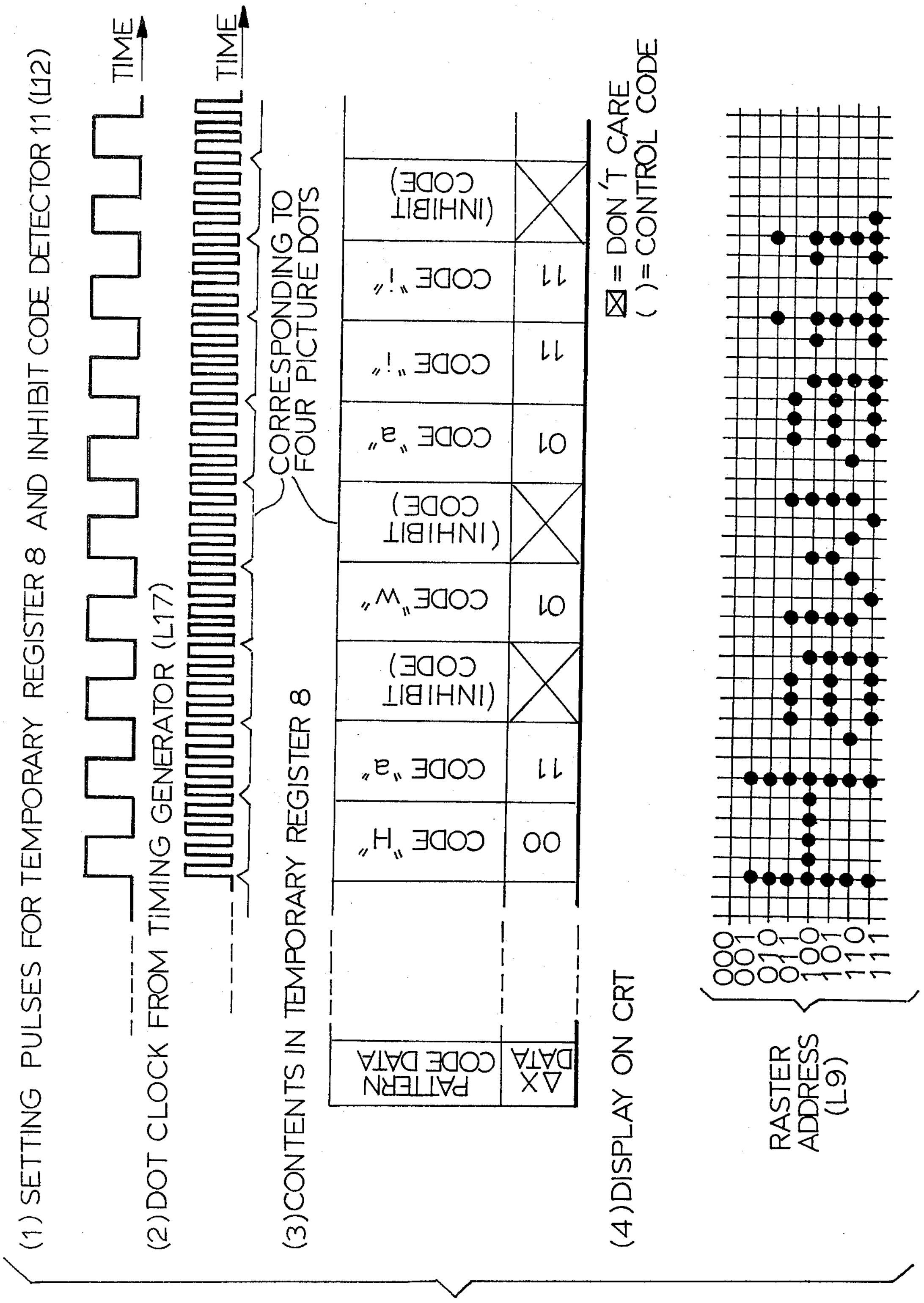
Figure 9:
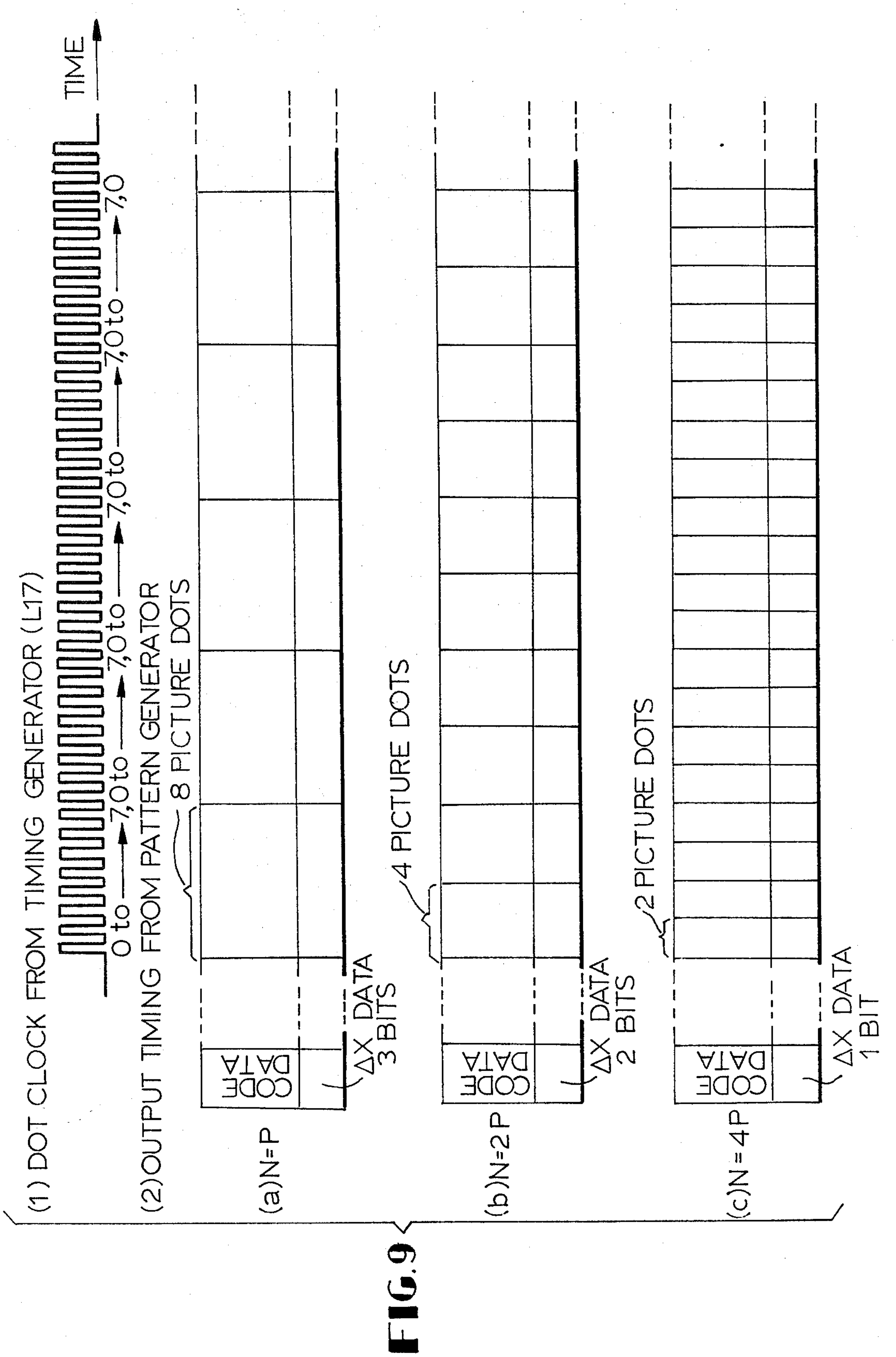
Figure 10:
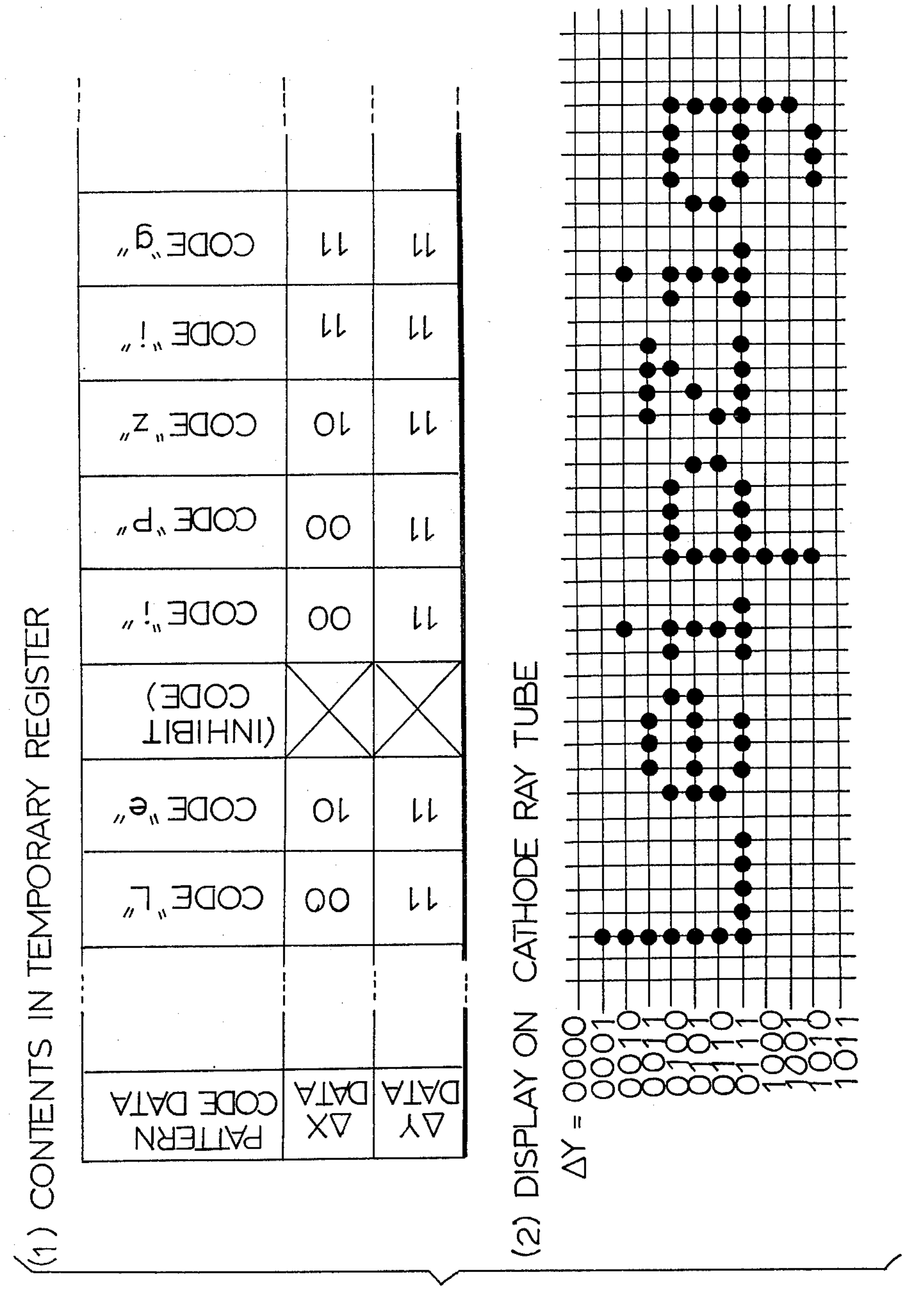
Figure 11:
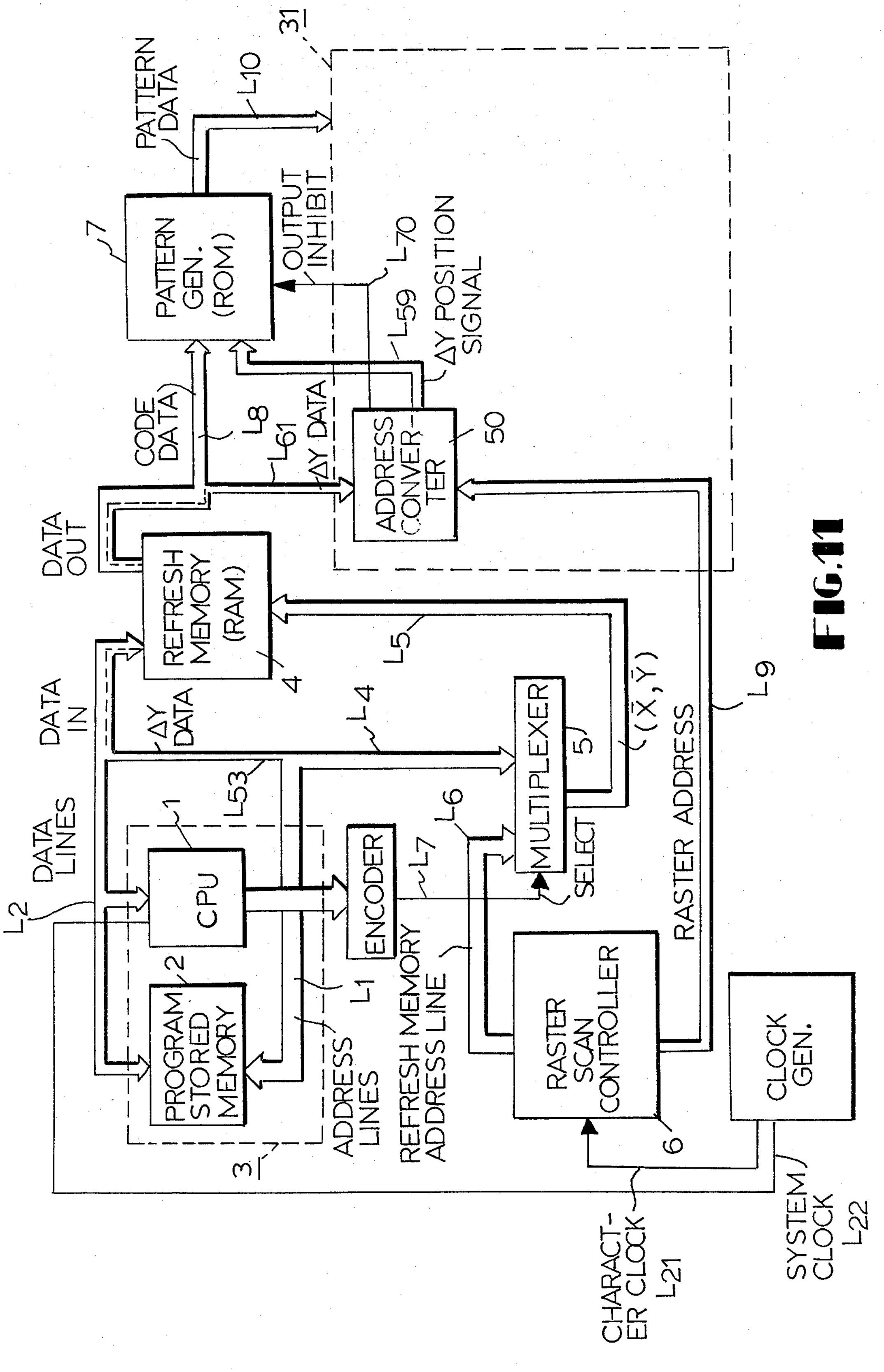
Figures 12, 13:
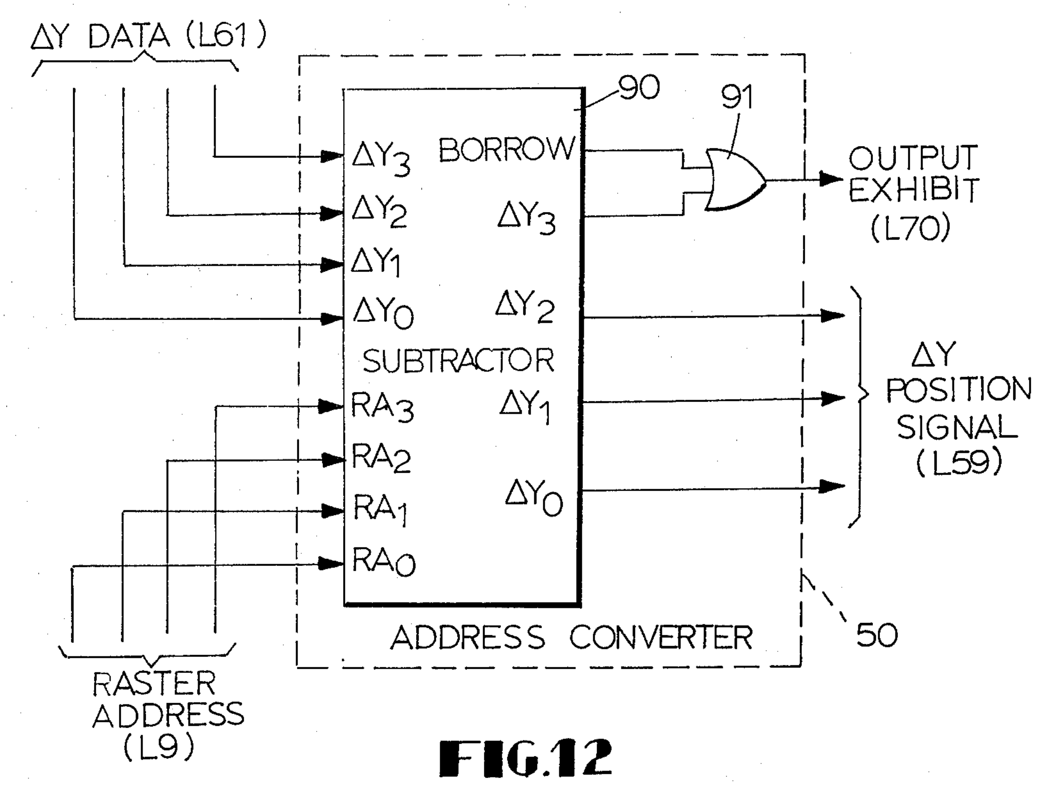

FIGS. 5*a*–5*c'* together constitute a chart showing the signal processing which is required for a raster scan controller;

FIG. 6 is a chart illustrating the relation between the timing explained in FIGS. 5*a*–5*c'* and the display position on the screen;

FIGS. 7*a* and 7*b* together constitute a chart showing the signal timings used in FIG. 3;

FIG. 8 is a chart symbolically illustrating aspects of the timing of the system in FIG. 3 and a display on the screen;

FIG. 9 is a chart symbolically illustrating variations of the timing of the system of FIG. 3;

FIG. 10 is a chart illustrating another preferred embodiment of the invention;

FIG. 11 is a block diagram illustrating the embodiment of FIG. 10;

FIG. 12 is a more detailed circuit diagram of some of the components shown in FIG. 11; and FIG. 13 is a chart explaining the circuit shown in FIG. 12.

In the drawings, similar reference numerals identify similar elements.

Figure 1:
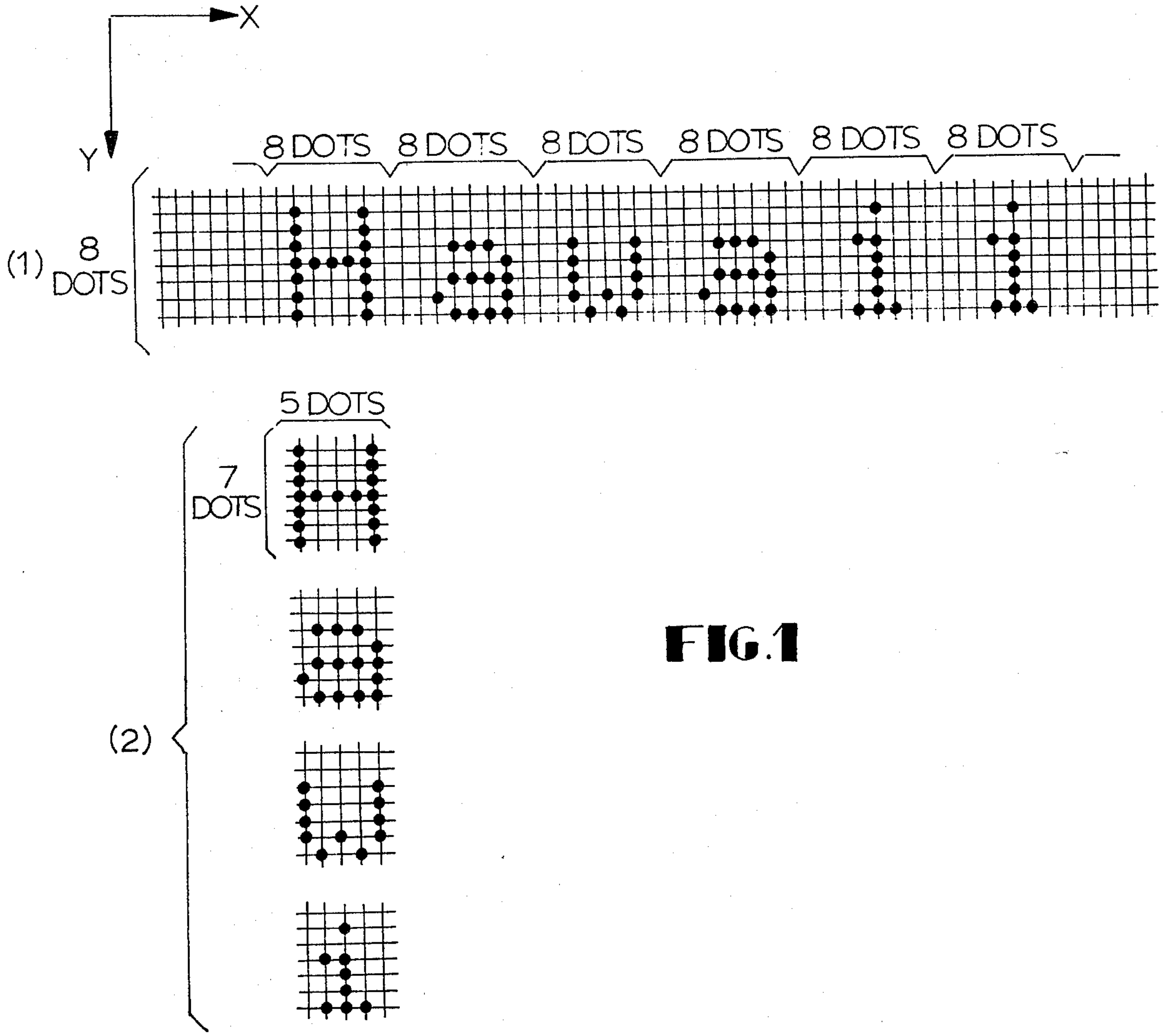
FIG. 1 depicts characters formed on a screen and picture dot matrixes within the pattern generator according to the prior art.
Figure 2:
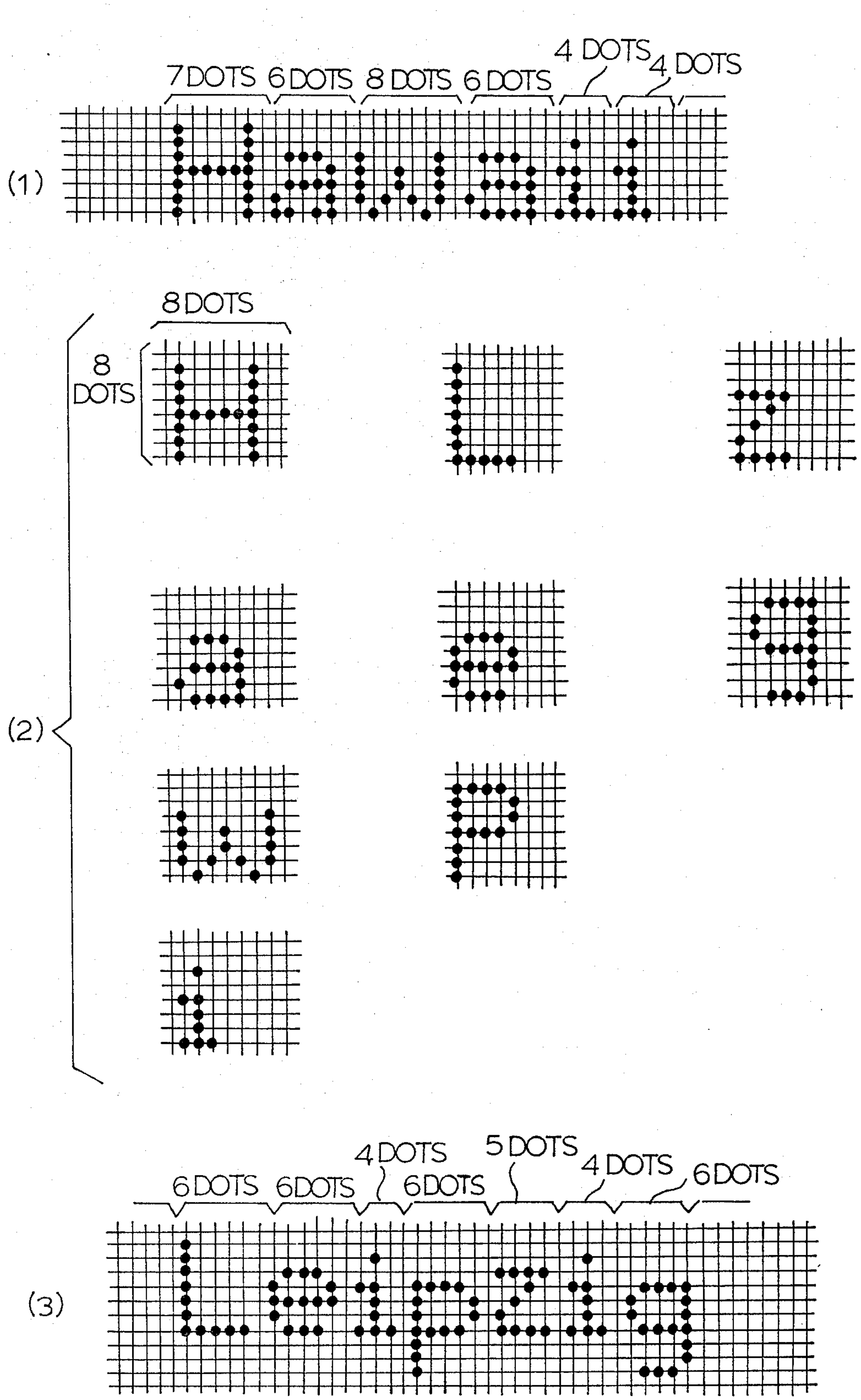
FIG. 2 depicts characters formed on a screen and picture dot matrix within a pattern generator according to the invention.

A character display on the screen produced by a typical known pattern generation display system is shown in FIG. 1 as an example. A conventional raster scan CRT used in a television receiver is employed in the following explanation. The position of the pattern on the CRT screen is defined by an X-Y coordinate, wherein the X coordinate is a horizontal and raster scan directional coordinate, and the Y coordinate is a vertical coordinate. Referring to FIG. 1(2), each picture dot pattern shows the contents of a character generator. Every picture dot pattern is composed of a five by seven dot matrix which is generally utilized. FIG. 1(1) shows a pattern arrangement which is accomplished by outputs from said pattern generator driven every eight picture dots. Each pattern appears on the CRT screen in a space constituted by eight picture dots, irrespective of the pattern features. However, the patterns have different features. Actually, the character "H" or "a" has a width of five picture dots, but the character "i" has a width of only three picture dots. Therefore, there are different width gaps between characters. This is not preferable for good perception of a word. Recognizing characters within one word as a whole is important for reading the word quickly. That is why it is undesirable to array characters within one word with substantially the same width gaps between characters. The arrangements shown in FIG. 2 (1) and (3) have been improved in this respect. These arrangements provide easier recognition of words. FIG. 2(2) shows the picture dot patterns in a character generator for preferred embodiments of the invention. Each is composed of an eight by eight dot matrix. However, the data in the pattern generator is stored in such a way that the left edge of the pattern of dots for each character is located at the left edge of said matrix. The following description describes how to achieve such a sophisticated arrangement using said pattern generator.

FIG. 3 and FIG. 11 show block diagrams for the explanation of two preferred embodiments by which the displays as shown in FIG. 2(1) and FIG. 2(3) can be achieved. A central processing unit (CPU) 1 is operated according to the program in a program-storing memory 2. Operation of the CPU 1 is performed by a system clock signal generated on the line $L_{22}$ by a timing generator 12. A pattern code processing means 3 comprises said CPU 1 and said program-storing memory 2. The pattern code processing means 3 implements the data processing for the patterns on the CRT screen. When the pattern code processing means 3 finishes data processing of one pattern, the pattern code processing means 3 transmits the position data for said pattern onto address lines $L_1$ and the pattern code datum of said pattern onto data lines $L_2$.

Figure 4:
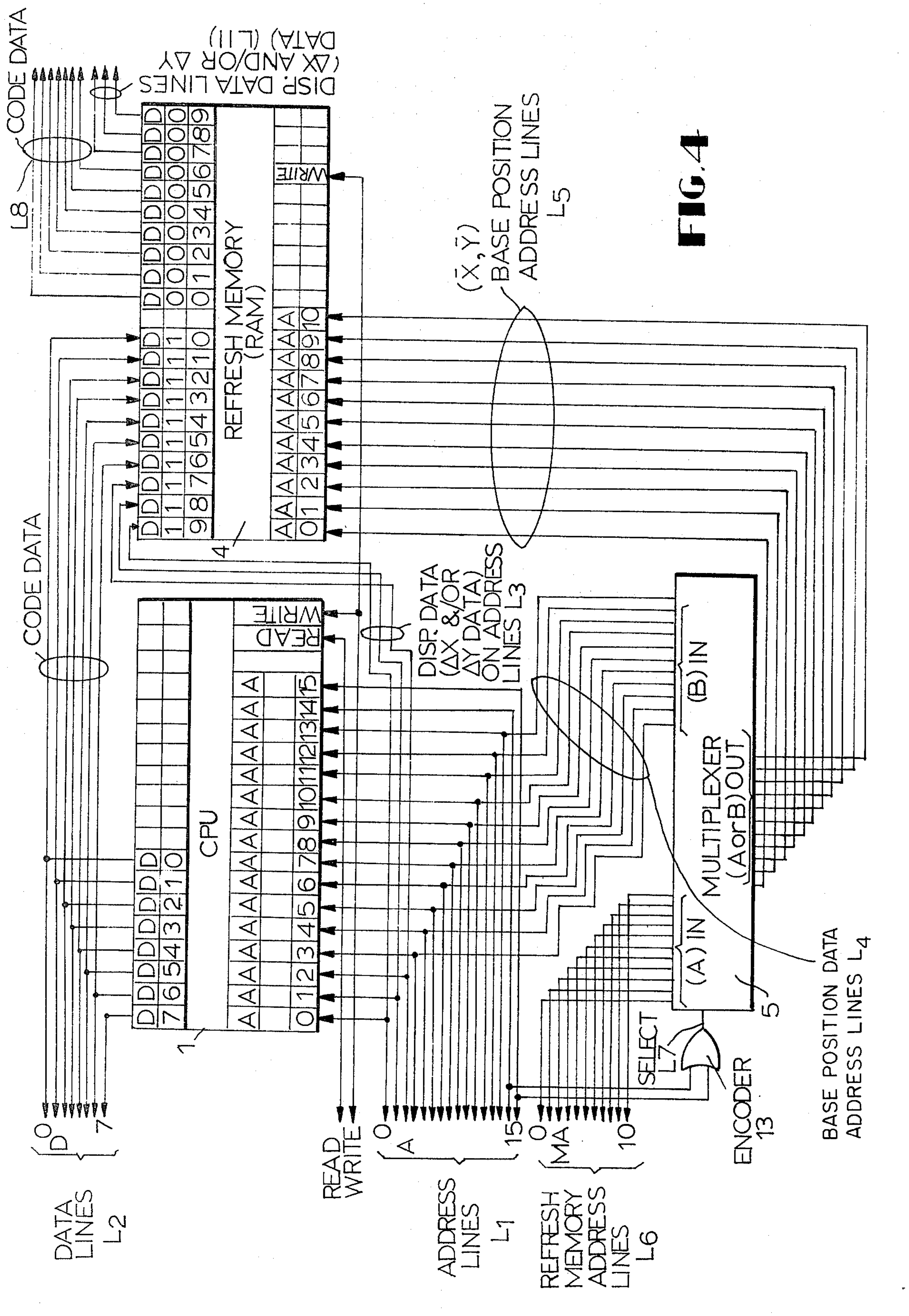
FIG. 4 is a more detailed circuit diagram of some of the components shown in FIG. 3.

A refresh memory 4 is a random access memory into which data can be written and from which the written data can be read out. The refresh memory 4 receives said position data and said pattern code data for each pattern. FIG. 4 shows the connection between the CPU 1 and the refresh memory 4. The position data of said pattern on the address lines $L_1$ is divided into two parts. One is base position data on lines $L_4$, by which the base position of a pattern on the CRT screen is defined. The other is displacement data on lines $L_3$, by which the deviation of said pattern from said base position on the CRT is defined. The lines $L_3$ and $L_2$ are connected to the input data terminals of the refresh memory 4. The lines $L_4$ are also connected to the address terminals of the refresh memory 5 through a multiplexer 5 and lines $L_5$. Lines $L_6$ are also connected to the multiplexer 5. Refresh memory address data generated by a raster scan controller 6 appear on the lines $L_6$. When the pattern code processing means 3 accesses the address of the encoder 13, a signal from the encoder 13 generates a signal on the select line 7, and the multiplexer 5 provides the base position data on the lines $L_4$ to the lines $L_5$. Otherwise, the multiplexer 5 provides the refresh memory address data on the lines $L_6$ to the lines $L_5$. When the base position data signal on the lines $L_4$ is supplied to the refresh memory 4, the pattern code data and the displacement data of each pattern are written into the address of the refresh memory 4 through the lines $L_4$ and the lines $L_5$. The refresh memory stores pattern code data and displacement data for all patterns on the CRT screen at the addresses corresponding to positions of patterns on the CRT screen.

Said displacement data contain $\Delta X$ and/or $\Delta Y$ data. FIG. 3 shows the case in which said displacement data consist of $\Delta X$ data, which defines the horizontal deviation from said base position on the CRT screen. FIG. 11 explains the displacement data $\Delta Y$, which defines the vertical deviation from said base position on the CRT screen. Referring to FIG. 3, during the period when the multiplexer 5 does not select the addresses of lines $L_4$, the multiplexer 5 selects the lines $L_6$ to provide the data on the lines $L_6$ to the address lines of the refresh memory 4 through the lines $L_5$. The raster scan controller 6 provides signals related to the electron beam of the CRT to the lines $L_6$. These signals are for reading out the pattern code data and $\Delta X$ data stored in the refresh memory 4. The pattern code data signals from the refresh memory are supplied to a pattern generator 7 through lines $L_8$. The pattern generator 7 also receives raster address signals from the raster scan controller 6 through lines $L_9$. The pattern generator 7 consists of a read-only memory where data for patterns such as shown in FIG. 2(2) are stored. The pattern code data signals and the raster address data signals are supplied to the address lines of said pattern generator 7. The pattern generator 7 generates the pattern data signals stored in the address represented by said pattern code data and the raster address data.

The pattern data signals are processed in a pattern code processing means 30 in the way explained in the following description. The pattern data which appear on the lines $L_{10}$ of said pattern generator and $\Delta X$ data which appear on the data lines $L_{11}$ of said refresh memory are latched to a temporary register 8 by a set signal from the timing generator 12. The pattern data and $\Delta X$ data latched in the temporary register 8 appear on lines $L_{13}$ and $L_{14}$. On the other hand, an inhibit code detector 11 also receives the inhibit code from said set signal, when the inhibit code appears on the lines $L_8$. Any available and suitable circuits for such an operation can be used for said inhibit code detector 11. The timing generator 12 generates a $\Delta x$ position signal which shows the horizontal deviation of the electron beam on the CRT screen from each base position. Said $\Delta x$ position signal on lines $L_{15}$ and $\Delta X$ data signal on lines $L_{14}$ are supplied to the comparator 9. The comparator 9 compares said two signals and produces a coincidence signal on line $L_{16}$ when they coincide with each other. By this coincidence signal, pattern data from said temporary register 8 on lines $L_{13}$ is supplied to a shift register 10. The timing generator generates a dot clock signal which is supplied to the shift register 10. The shift register 10 shifts said pattern data serially toward the CRT, in response to said dot clock. Thus, the pattern data is converted to the picture pattern on the CRT screen.

When the inhibit code detector 11 detects the inhibit code, the inhibit code detector 11 supplies an inhibit signal to the comparator 9. When it is present, said inhibit signal prohibits the coincidence signal from appearing on the line $L_{16}$. Consequently the shift register 10 cannot receive new pattern data from lines $L_{13}$, even if ΔX data signal on the lines $L_{14}$ coincides with Δx position signal on the lines $L_{14}$. Once the coincidence signal on the line $L_{16}$ is generated, eight picture dots of the pattern data on the lines $L_{13}$ are latched parallelly into the shift register 10. Thereafter, after eight dot clock signals are generated on the line $L_{17}$, no signal from the shift register 10 is generated. Any available and suitable circuits for the comparator 9 and the shift register 10 can be used.

The raster scan controller 6 used therein, for example, is a HITACHI LST chip, HD46505 (CRTC). The chart for FIGS. 5*a*–5*c'* shows the operation of the raster scan controller 6, and FIG. 6 shows the positions on the CRT screen, corresponding to the signals designated in FIG. 5. Referring to the chart of FIGS. 5*a*–5*c'*, the pattern clock pulse ($S_o$) is the pulse generated on the line $L_{21}$ by the timing generator 12. The pattern clock period $T_p$ is the period of said pattern clock pulse ($S_o$). The horizontal total pattern number $N_{ht}$ is a number which is obtained by dividing the horizontal scan time by the pattern clock period $T_p$. The horizontal display pattern number $N_{hd}$ is the number of patterns which are actually displayed on the CRT screen. The display timing ($S_1$) indicates the relation of the horizontal scan display time, the horizontal scan retrace time, the vertical scan display time and the vertical scan retrace time. (See FIG. 6). The horizontal synchronizing signal ($S_2$) and the vertical synchronizing signal ($S_6$) are CRT synchronizing signals produced on lines $L_{19}$. ($S_3$) designates refresh memory address data on lines $L_6$, which are MA0–MA10 in FIG. 4. These data appear, being synchronized with the pattern clock pulses ($S_o$). ($S_4$) designates the raster address data on lines ($L_9$). $N_r$ is a maximum raster address. One pattern line consists of the raster scans from the raster address 0 to the raster address $N_r$, as shown in FIG. 6. ($S_5$) designates the pattern line number on the CRT screen. $N_{vt}$ is a vertical total pattern number which is obtained by dividing the vertical scan time by the raster scan time for displaying one pattern line. $N_{vd}$ is a vertical display pattern number which is the number of patterns actually displayed on the CRT screen. The period from the vertical display pattern number $N_{vd}$ to the vertical total pattern number $N_{vt}$ is the vertical scan retrace time. (See FIG. 6). The vertical synchronizing signal ($S_6$) is a signal produced on lines 19.

The chart of FIGS. 7*a* and 7*b*, and FIG. 8 explain the signal processing of the embodiment shown in FIG. 3. Referring to the chart of FIGS. 7*a* and 7*b*, ($S_7$) is the data on lines $L_5$ which is generated through the multiplexer 5 by the raster scan controller 6. If the encoder 13 is not selected by the CPU 1, said multiplexer 5 passes the data ($S_3$) on the lines $L_6$. ($S_4$) is the data of the lines $L_9$. ($S_7$) is supplied to the refresh memory 4. Corresponding to the data ($S_7$), the refresh memory 4 produces output signals at its output terminals, after the access time. Said output signals consist of code data ($S_8$) and ΔX data ($S_9$). Raster address data ($S_4$) and code data ($S_8$) are applied to the address lines of the pattern generator 7. Pattern data appears at the output terminals of said pattern generator 7, after the access time. ($S_{11}$) are the setting pulses for the temporary register 8, and if necessary, the inhibit code detector 11. The positive-going transition of pulses ($S_{11}$) which are generated by the timing generator 12 are the set signals for the temporary register 8 and the inhibit code detector 11. The temporary register 8 sets pattern data ($S_{10}$) and ΔX data ($S_9$), which appear at the output terminals of said temporary register 8, as pattern data ($S_{13}$) and ΔX data ($S_{14}$). If ($S_8$) shows the inhibit code, the inhibit code detector 11 produces the output signal ($S_{12}$). ($S_{15}$) is the Δx position signal data from the timgenerator 12 through lines $L_{15}$. ($S_{15}$) shows the lower parts of the absolute position of the electron beam on the CRT screen.

The comparator 9 compares the ΔX data ($S_{14}$) with the Δx position signal data ($S_{15}$), and, when said ΔX data ($S_{14}$) coincides with said Δx position signal data ($S_{15}$), the comparator 9 produces the coincidence signal ($S_{16}$). ($S_{17}$) is the dot clock pulses from the timing generator 12. The shift register 10 sets pattern data ($S_{13}$) at the time of the positive-going transition of the dot clock pulses ($S_{17}$), when the coincidence signal ($S_{16}$) is "ON". Otherwise, said shift register 10 does not set pattern data ($S_{13}$), but shifts the contents in response to said dot clock pulses ($S_{17}$). Referring to FIG. 8, (1) and (2) correspond to ($S_{11}$) and ($S_{17}$) respectively. (3) shows the contents stored sequentially in the temporary register 8. Pattern code data which include the inhibit code are stored in the temporary register 8 together with ΔX data by the positive-going transition of the pulses of FIG. 8(1). The content of the temporary register 8 is newly stored every time period having a duration corresponding to four pattern dots. Pattern code data in the temporary register 8 are set in the shift register 10 by the timing signals generated when ΔX data in the temporary register 8 coincides with the Δx position signal data, that is the number of pattern dots produced after the data are newly set in the temporary register 8. For example, if the ΔX data in the temporary register 8 is $(00)_2$, the pattern code belonging to said ΔX data is set in the shift register 10 by the first dot clock pulse after the data is newly set in the temporary register 8. If the ΔX data is $(01)_2$, the pattern code is set by the second dot clock pulse. If the ΔX data is $(10)_2$, the pattern code is set by the third dot clock pulse. An if the ΔX data is $(11)_2$, the pattern code is set by the fourth dot clock pulse. However, when the pattern code data in the temporary register 8 indicate the inhibit code, ΔX data is not useful. As a result of said procedure, the display as shown in FIG. 8(4) is achieved.

The data written in the chart of FIGS. 7*a* and 7*b* explain the data processing for the case where the raster address data is $(100)_2$ regarding the display of FIG. 8(4). In FIGS. 7*a* and 7*b*, data written in the timing signals respond to the raster address $(100)_2$ of FIG. 8.

The chart of FIG. 9 shows that this invention can be applied widely. In a conventional pattern generation such as shown in FIG. 1(1), the pattern generator has to generate the pattern data every time period corresponding to eight picture dots as shown in FIG. 9(*a*). However, in the preferred embodiment of this invention, the pattern generator 7 generates the pattern data every time period corresponding to four picture dots as shown in FIG. 9(*b*). Furthermore, there may exist a system in which the pattern generator generates the pattern data every time period corresponding to two picture dots as shown in FIG. 9(*c*). The temporary register renews its content every corresponding time period. Generally, the refresh memory has the address N in the raster direction, the contents of the pattern generator consist of pattern data of S picture dots in the raster direction, and P×S picture dots can be displayed on the CRT screen, where N, S and P are integers. The conventional system can display P patterns in the raster direction. However, in this invention, if necessary, the system can display the patterns of N which may be partial patterns, where N is greater than P. Naturally, the pattern data of S picture dots stored in said pattern generator does not always appear on the CRT screen. In these systems, the optimum conditions are that $S=2^s$, $N/P=2^m$ and ΔX data consist of (s−m) bits, where s and m are integers.

Further, if, in addition to the signal processing for a ΔX directional displacement as in FIG. 3, there is provided a ΔY directional displacement, the signal processing as shown in FIG. 11 is required. FIG. 11 shows another preferred embodiment of this invention. It can produce a pattern such as shown in FIG. 2(3). Referring to FIG. 11, the parts of the system for handling ΔY data are shown. In the following description, the explanation concerning ΔX data will be omitted, because the signal processing of ΔX data is similar to the operation as described in connection with FIG. 3. ΔY data also is processed by the pattern code processing means 3, and appears on the address lines $L_{53}$. Said ΔY data is stored in the refresh memory 4, together with the ΔX data for each pattern. The contents of the refresh memory 4 are read out in response to signals on the lines $L_5$. Said ΔY data appears at the output terminals of the refresh memory 4, along with the pattern code data and ΔX data. The pattern code data is transmitted to the pattern generator 7 through lines $L_8$. And ΔY data is transmitted to an address converter 50. The address converter 50 also receives the raster address data from the raster scan controller 6 through lines $L_9$. The output data of the address converter 50 is transmitted to the pattern generator 7 through lines $L_{59}$, and line 70.

FIG. 12 shows the details of said address converter 50. The address converter 50 consists of a subtractor 90 and an OR gate 91. The subtractor 90 performs the operation of substracting ΔY data from the raster address data. The borrow and the most significant bit signals are supplied to the OR gate 91, and the output signal of said OR gate 91 is supplied to the pattern generator 7.

FIG. 13 shows a truth table explaining the operation of the address converter 50. Any available and suitable circuits can be used for the subtractor. If the output inhibit signal on line $L_{70}$ is "1", the pattern generator is inhibited from producing the pattern data. As a result, the pattern can be shifted from the raster to the base position on the CRT display by ΔY data.

FIG. 10 shows the relation between the contents in the temporary register and the display corresponding to said contents. In FIG. 10(1), ΔX data are processed by the signal processing as described in connection with FIG. 3. ΔY data is for the vertical displacement of the pattern by $(11)_2$. These are processed by the system as described in connection with FIG. 11.

In the above-described figures, any available and suitable circuits can be used for the timing generator 12.

The position data for the pattern is processed in the pattern code processing means and appears on the address lines thereof. At the pattern code processing means, both base position address data ($\bar{X}$, $\bar{Y}$) and displacement data (ΔX, ΔY) are calculated at the same time. This structure is effective, because both of them indicate the position of the pattern on the CRT screen, and because the CPU can process both of the data at the same time.

In view of the foregoing, it can now be understood that the pattern generated by the pattern generator can move on the CRT screen by a small pitch. Therefore, it is easy to adjust the position of characters for obtaining the optimum character gap in response to the character and sentence features. The useless gap between characters can be shortened as shown in FIG. 2. These techniques are quite effective especially when small alphanumerical characters are employed, because the number of characters displayed on one character line can be increased by nearly thirty percent without increasing the frequency characteristics of a video amplifier used in the CRT display equipment. Moreover, because the pattern can be moved by a small pitch, a game can be played on the CRT screen according to a program within the program stored memory.

This invention has been explained in connection with a CRT display. However, it can also be applied to other displays such as a plasma display, a liquid crystal display and a LED display.

While preferred embodiments of this invention have been shown and described, modifications may be made without departing from the concept of this invention, and it is intended in the following claims to cover such modifications which fall within the spirit and scope of this invention.

What is claimed is:

1. A pattern generation display system having in combination a display screen and means for controlling shifting of positions of patterns by a small pitch on a display screen, said controlling means comprising:
- a pattern code processing means for producing (1) pattern code data, and (2) position data composed of base position adress data and displacement data representing displacement with respect to each pattern and its position on the display screen;
- a raster scan controller for generating base address data signals and raster address data signals corresponding to positions of rasters on the display screen;
- a refresh memory coupled to said pattern code processing means and said raster scan controller for (1) storing pattern code data and displacement data at addresses corresponding to base position address data from said pattern code processing means, and (2) for transmitting pattern code data and displacement data when supplied with base position address data signals from said raster scan controller;
- a pattern generator coupled to said refresh memory and said raster scan controller for generating pattern data corresponding to said pattern code data from said refresh memory and said raster address data from said raster scan controller; and
- a pattern data signal processing means coupled to said pattern generator and said refresh memory for transmitting said pattern data from said pattern generator with a timing defined by said base position address data and said raster address data from said raster scan controller, and by said displacement data of said refresh memory.

2. A pattern generation display system according to claim 1, wherein said pattern code processing means comprises means for generating said base position address data and said displacement data on an address bus thereof and for generating said pattern code data on a data bus thereof.

3. A pattern generation display system according to claim 1, in which said display has P×S dots in the raster direction, and said pattern generator comprises means for generating data corresponding to S dots every time pattern code data is supplied thereto, and said refresh memory comprises N raster directional addresses, number N being greater than P.

4. A pattern generation display system according to claim 3, wherein $S=2^s$, $N/P=2^m$, and the raster directional part of said displacement data consists of $(s-m)$ bits.

5. A pattern generation display system according to claim 1, wherein said pattern data signal processing means comprises a shift register into which said pattern data are loaded in parallel with a timing defined by the raster directional part of said displacement data, and for shifting said pattern data set in said shift register out in series in response to dot clock pulses supplied thereto.

6. A pattern generation display system according to claim 5, wherein said pattern code data contains an inhibit code which inhibits said shift register from loading said pattern data in parallel.

* * * * *